United States Patent
Maliverney et al.

(10) Patent No.: US 8,835,590 B2
(45) Date of Patent: Sep. 16, 2014

(54) ROOM TEMPERATURE VULCANIZABLE ORGANOPOLYSILOXANE COMPOUND TO GIVE AN ELASTOMER AND NOVEL ORGANOPOLYSILOXANE POLYCONDENSATION CATALYSTS

(75) Inventors: Christian Maliverney, Saint Julien sur Bibost (FR); Laurent Saint-Jalmes, Vourles (FR)

(73) Assignee: Bluestar Silicones France SAS, Lyon Cedex 03 (FR)

( * ) Notice: Subject to any disclaimer, the term of this patent is extended or adjusted under 35 U.S.C. 154(b) by 272 days.

(21) Appl. No.: 12/809,552

(22) PCT Filed: Dec. 18, 2008

(86) PCT No.: PCT/FR2008/001768
§ 371 (c)(1), (2), (4) Date: Nov. 8, 2010

(87) PCT Pub. No.: WO2009/106718
PCT Pub. Date: Sep. 3, 2009

(65) Prior Publication Data
US 2011/0046304 A1    Feb. 24, 2011

(30) Foreign Application Priority Data

Dec. 20, 2007 (FR) ..................................... 07 08924
Sep. 2, 2008 (FR) ..................................... 08 04801

(51) Int. Cl.
C08L 83/04  (2006.01)
C08G 77/08  (2006.01)
C08G 77/18  (2006.01)
C08G 77/14  (2006.01)

(52) U.S. Cl.
CPC ............... *C08L 83/04* (2013.01); *C08G 77/08* (2013.01); *C08G 77/18* (2013.01); *C08G 77/14* (2013.01)
USPC ............................................. 528/14; 524/588

(58) Field of Classification Search
None
See application file for complete search history.

(56) References Cited

U.S. PATENT DOCUMENTS

| | | | | |
|---|---|---|---|---|
| 3,453,300 A | * | 7/1969 | Backus et al. | 556/40 |
| 5,055,502 A | * | 10/1991 | Frances et al. | 524/780 |
| 2004/0122199 A1 | | 6/2004 | Scheim et al. | |
| 2005/0272895 A1 | | 12/2005 | Ziche et al. | |
| 2007/0203316 A1 | | 8/2007 | Inokuchi | |
| 2008/0207938 A1 | | 8/2008 | Prasse | |

FOREIGN PATENT DOCUMENTS

EP    0354138    2/1990

OTHER PUBLICATIONS

International Search Report based on PCT/FR2008/001768 dated Jul. 15, 2009 (6 pgs.).

* cited by examiner

Primary Examiner — Marc Zimmer
(74) Attorney, Agent, or Firm — Miles & Stockbridge P.C.

(57) ABSTRACT

The present invention relates to an organopolysiloxane composition that can be vulcanized at room temperature into an elastomer that is crosslinked by polycondensation and that does not contain alkyltin-based catalysts and also to novel organopolysiloxane polycondensation catalysts.

21 Claims, No Drawings

ROOM TEMPERATURE VULCANIZABLE ORGANOPOLYSILOXANE COMPOUND TO GIVE AN ELASTOMER AND NOVEL ORGANOPOLYSILOXANE POLYCONDENSATION CATALYSTS

CROSS REFERENCE TO RELATED APPLICATIONS

This application is a §371 National Stage Application of PCT/FR2008/001768 filed Dec. 18, 2008, which claims priority to French Application 07 08924 filed Dec. 20, 2007, and French Application 08 04801 filed Sep. 2, 2008.

BACKGROUND OF THE INVENTION

1. Field of the Invention

The present invention relates to an organopolysiloxane composition that can be vulcanized at room temperature into an elastomer that is crosslinked by polycondensation and that does not contain alkyltin-based catalysts which exhibit toxicity problems.

The invention also relates to novel polycondensation catalysts in silicone chemistry, and to the uses thereof as catalysts for the polycondensation reaction of organopolysiloxanes.

2. Description of Related Art

Elastomer formulations that crosslink via polycondensation generally involve a silicone oil, generally a polydimethylsiloxane, with hydroxyl end groups, optionally prefunctionalized by a silane so as to have alkoxy ends, a crosslinker, a polycondensation catalyst, conventionally a tin salt or an alkyl titanate, a reinforcing filler and other optional additives such as bulking fillers, adhesion promoters, colorants, biocidal agents, etc.

These room-temperature vulcanizing organopolysiloxane compositions are well known and are classified into 2 different groups: single-component compositions (RTV-1) and two-component compositions (RTV-2).

During crosslinking, water (either provided by atmospheric moisture in the case of RTV-1 compositions, or introduced into one part of the composition in the case of RTV-2 compositions) enables the polycondensation reaction, which results in the formation of the elastomeric network.

Generally, single-component (RTV-1) compositions crosslink when they are exposed to moisture from the air, that is to say that they cannot crosslink in an enclosed medium. For example, the single-component silicone compositions used as sealants or cold-setting adhesives follow a mechanism of hydrolysis of reactive functional groups of the acetoxysilane, ketiminoxysilane, alkoxysilane, etc. type, followed by condensation reactions between the silanol groups formed and other residual reactive functional groups. The hydrolysis is generally carried out by virtue of water vapor which diffuses into the material from the surface exposed to the atmosphere. Generally, the kinetics of the polycondensation reactions is extremely slow; these reactions are therefore catalyzed by a suitable catalyst. As catalysts which are used, use is most often made of catalysts based on tin, titanium, an amine or compositions of these catalysts. Catalysts based on tin (cf. in particular FR-A-2 557 582) and on titanium (cf. in particular FR-A-2 786 497) are catalysts that are very effective.

As regards two-component compositions, they are sold and stored in the form of two components, a first component containing the base polymer materials and the second component containing the catalyst. The two components are mixed at the moment of use and the mixture crosslinks in the form of a relatively hard elastomer. These two-component compositions are well known and are described, in particular, in the book by Walter Noll "Chemistry and Technology of Silicones" 1968, 2nd Edition, on pages 395 to 398. These compositions essentially comprise 4 different ingredients:
a reactive $\alpha,\omega$-dihydroxydiorganopolysiloxane polymer,
a crosslinking agent, generally a silicate or a polysilicate,
a tin catalyst, and
water.

Usually, the condensation catalyst is based on an organic tin compound. Indeed, many tin-based catalysts have already been proposed as crosslinking catalysts for these RTV-2 compositions. The most widely used compounds are alkyltin carboxylates such as tributyltin monooleate or dialkyltin dicarboxylates such as dibutyltin dilaurate, dibutyltin diacetate or dimethyltin dilaurate (see the book by Noll "Chemistry and Technology of silicones" page 337, Academic Press, 1968—$2^{nd}$ Edition or patents EP 147 323 or EP 235 049).

However, the alkyltin-based catalysts, although very effective, usually colorless, liquid and soluble in silicone oils, have the drawback of being toxic (CMR2 toxic for reproduction).

Titanium-based catalysts, also widely used in RTV-1 compositions, have however a major drawback:
they have slower kinetics than tin-based catalysts. Furthermore, these catalysts cannot be used in RTV-2 compositions due to gelling problems.

Other catalysts are sometimes mentioned, such as catalysts based on zinc, zirconium or aluminum, but they have only experienced minor industrial development due to their mediocre effectiveness.

For sustainable development, it therefore appears necessary to develop nontoxic catalysts for the polycondensation reaction of organopolysiloxanes.

Another important aspect for a catalyst of the polycondensation reaction of organopolysiloxanes is the pot life, that is to say the time during which the composition can be used after mixing without curing. This time must be long enough to allow it to be used, but short enough to obtain a moulded article that can be handled at the latest a few minutes or a few hours after it has been manufactured. The catalyst must thus make it possible to obtain a good compromise between the pot life of the catalyzed mixture and the time at the end of which the molded article can be handled (these times depend on the targeted application such as, for example, the molding or manufacture of seals). In addition, the catalyst must confer, on the catalyzed mixture, a spreading time which does not vary as a function of the storage time.

SUMMARY OF THE INVENTION

The main objective of the present invention is therefore to find novel catalysts that enable, in moisture from the air, both a surface crosslinking and a core crosslinking that is as complete as possible.

Another main objective of the present invention is to propose a catalyst that can be used both in the crosslinking of single-component and two-component elastomer compositions.

Another main objective of the present invention is to propose a catalyst system that continues to simultaneously meet the constraints of storage, of processing and of crosslinking of the two types of single-component and two-component elastomer compositions.

These objectives, among others, are achieved by the present invention, which relates firstly to an organopolysiloxane composition, characterized in that it comprises, on the one hand, a silicone base B capable of curing via polycondensation reaction into a silicone elastomer and, on the other hand, a catalytically effective amount of at least one polycondensation catalyst which is a metal complex or salt A of formula (1):

$$[Zn(L^1)(L^2)] \quad (1)$$

in which:
the symbols $L^1$ and $L^2$ are identical or different and represent a ligand which is a β-dicarbonylato anion or the enolate anion of a β-dicarbonyl-containing compound of formula (2) or an acetylacetato anion derived from a β-keto ester of formula (2) below:

$$R^1COCHR^2COR^3 \quad (2)$$

in which:
$R^1$ represents a substituted or unsubstituted, linear or branched $C_1$-$C_{30}$ hydrocarbon-based radical;
$R^2$ is a hydrogen or a substituted or unsubstituted, linear or branched $C_1$-$C_{30}$ hydrocarbon-based radical, preferably a hydrogen atom or an alkyl radical having at most 4 carbon atoms;
$R^3$ represents a substituted or unsubstituted, linear, cyclic or branched $C_1$-$C_{30}$ hydrocarbon-based radical, a substituted or unsubstituted aromatic, or an —$OR^4$ radical with $R^4$ representing a substituted or unsubstituted, linear, cyclic or branched $C_1$-$C_{30}$ hydrocarbon-based radical, where
$R^1$ and $R^2$ may be joined together to form a ring;
$R^2$ and $R^3$ may be joined together to form a ring; and
with the supplementary condition that the metal complex or salt A of formula (1) is not the zinc diacetylacetonate or $Zn(acac)_2$ compound.

The definition "metal complex or salt A" is understood to include any oligomeric form or analog of said metal complex or salt A.

DETAILED DESCRIPTION OF A PREFERRED EMBODIMENT

It is to the credit of the inventors that they have found, quite surprisingly and unexpectedly, that it is advisable to use metal complexes of a selection of certain metals, at least one ligand of which is a β-dicarbonylato anion, in order to obtain excellent catalysts for the polycondensation reaction of organopolysiloxanes.

It is also to the credit of the inventors that they have overcome the technical prejudice that hitherto decreed that certain complexes of metals, such as zinc for example, have only a mediocre activity in the polycondensation reaction of organopolysiloxanes.

The definition of the ligands is taken from the book "Chimie Organométallique" [Organometallic Chemistry] by Didier Astruc, published in 2000 by EDP Sciences, cf., in particular, Chapter 1, "Les complexes monométalliques" [Single metal complexes], pages 31 et seq.

The catalyst according to the invention may be in the solid or liquid state. It may be incorporated alone or in a suitable solvent. When it is in solvent, a silicone oil may be added, the solvent is then evaporated so as to transfer the catalyst into a silicone medium. The mixture obtained acts as a catalyzing base.

For carrying out the invention use is preferably made, as polycondensation catalyst according to the invention, of a metal complex or salt A chosen from the group constituted by the complexes (3) to (6) below:

(3): $Zn(DPM)_2$ or $[Zn(t\text{-Bu-acac})_2]$ where DPM=(t-Bu-acac)= the 2,2,6,6-tetramethyl-3,5-heptanedionato anion or the enolate anion of 2,2,6,6-tetramethyl-3,5-heptanedione;

(4): $[Zn(EAA)_2]$ where EAA=the ethyl acetoacetato anion or the enolate anion of ethyl acetoacetate;

(5): $[Zn(iPr\text{-}AA)_2]$ where iPr-AA=the isopropyl acetoacetato anion or the enolate anion of isopropyl acetoacetate; and (6):

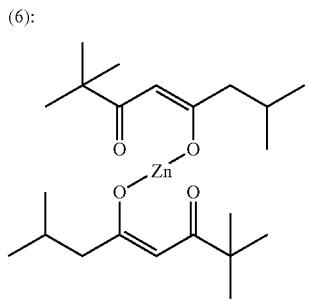

It should be noted that at least one part of the inventive nature of the invention is due to the judicious and advantageous selection of the defined associations of metal compounds A used as polycondensation catalyst.

According to one preferred embodiment, the polycondensation catalyst A according to the invention is zinc bis(2,2,7-trimethyl-3,5-octanedionate) of formula (6) below:

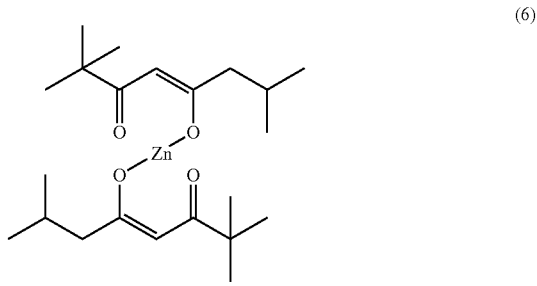

This catalyst has the advantage of being liquid at room temperature (25° C.) and soluble in organic solvents, even in alkanes, and in silicone oils.

According to one preferred embodiment, the β-dicarbonylato ligands $L^1$ and $L^2$ are β-diketonato anions derived from a β-diketone chosen from the group constituted by the following β-diketones: 2,4-hexanedione; 2,4-heptanedione; 3,5-heptanedione; 3-ethyl-2,4-pentanedione; 5-methyl-2,4-hexanedione; 2,4-octanedione; 3,5-octanedione; 5,5-dimethyl-2,4-hexanedione; 6-methyl-2,4-heptanedione; 2,2-dimethyl-3,5-nonanedione; 2,6-dimethyl-3,5-heptanedione; 2-acetylcyclohexanone (Cy-acac); 2,2,6,6-tetramethyl-3,5-heptanedione (t-Bu-acac); 1,1,1,5,5,5-hexafluoro-2,4-pentanedione (F-acac); benzoylacetone; dibenzoylmethane; 3-methyl-2,4-pentadione; 3-acetyl-2-pentanone; 3-acetyl-2-hexanone; 3-acetyl-2-heptanone; 3-acetyl-5-methyl-2-hexanone; stearoyl benzoyl methane; octanoyl benzoyl methane; 4-t-butyl-4'-methoxydibenzoylmethane; 4,4'-dimethoxydibenzoylmethane and 4,4'-di-tert-butyldibenzoylmethane.

According to another preferred embodiment, the β-dicarbonylato ligands $L^1$ and $L^2$ are β-ketoesterato anions chosen from the group constituted by the anions derived from the following compounds: methyl, ethyl, n-propyl, isopropyl, n-butyl, sec-butyl, isobutyl, tert-butyl, isopentyl, n-hexyl, n-octyl, 1-methylheptyl, n-nonyl, n-decyl and n-dodecyl esters of acetylacetic acid.

The invention also relates to the novel compounds of formulae (5) and (6) below:

(5): [Zn(iPr-AA)$_2$] where iPr-AA=the isopropyl acetoacetato anion or the enolate anion of isopropyl acetoacetate; and (6): zinc bis(2,2,7-trimethyl-3,5-octanedionate) of formula:

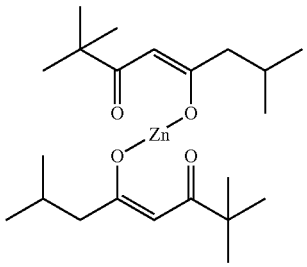

Another subject of the invention consists of the use, as a catalyst for the polycondensation reaction of organopolysiloxanes, of metal complexes or salts A according to the invention and as defined above.

The amount of polycondensation catalyst according to the invention (metal complex or salt A) is between 0.1 and 10% by weight of the total weight, preferably between 0.5 and 5%, whether it is a single-component or two-component preparation.

Description of the Silicone Base B:

The silicone bases used in the present invention that crosslink and cure via polycondensation reactions are well known. These bases are described in detail in particular in numerous patents and they are commercially available.

These silicone bases may be single-component bases, that is to say bases that are packaged in a single package, and stable during storage, in the absence of moisture, which can be cured in the presence of moisture, in particular moisture provided by the ambient air or by water generated within the base during the use thereof Apart from single-component bases, use may be made of two-component bases, that is to say bases that are packaged in two packages, which cure as soon as the polycondensation catalyst according to the invention is incorporated. They are packaged, after incorporation of the catalyst, in two separate fractions, one of the fractions possibly containing, for example, only the catalyst according to the invention or a mixture with the crosslinking agent.

The silicone base B used to produce the composition according to the invention may comprise:

- at least one polyorganosiloxane oil C capable of crosslinking via polycondensation into an elastomer;
- optionally at least one crosslinking agent D;
- optionally at least one adhesion promoter E; and
- optionally at least one siliceous, organic and/or non-siliceous mineral filler F.

The polyorganosiloxane oil C is preferably an α,ω-dihydroxypolydiorganosiloxane polymer, with a viscosity between 50 and 5,000,000 mPa·s at 25° C. and the crosslinking agent D is preferably an organosilicon compound bearing more than two hydrolyzable groups bonded to the silicon atoms per molecule. The polyorganosiloxane oil C may also be functionalized at its ends by hydrolyzable radicals obtained by condensation of a precursor bearing hydroxyl functional groups with a crosslinking silane bearing hydrolyzable radicals.

As the crosslinking agent (D), mention may be made of: silanes of the following general formula:

$$R^1_k Si(OR^2)_{(4-k)}$$

in which the symbols R$^2$, which are identical or different, represent alkyl radicals having from 1 to 8 carbon atoms, such as methyl, ethyl, propyl, butyl, pentyl or 2-ethylhexyl radicals, C$_3$-C$_6$ oxyalkylene radicals, the symbol R$^1$ represents a linear or branched, saturated or unsaturated, aliphatic hydrocarbon-based group, a saturated or unsaturated and/or aromatic, monocyclic or polycyclic carbocyclic group, and k is equal to 0, 1 or 2; and the partial hydrolysis products of this silane.

As examples of C$_3$-C$_6$alkoxyalkylene radicals, mention may be made of the following radicals:

CH$_3$OCH$_2$CH$_2$—
CH$_3$OCH$_2$CH(CH$_3$)—
CH$_3$OCH(CH$_3$)CH$_2$—
C$_2$H$_5$OCH$_2$CH$_2$CH$_2$—

The symbol R$^1$ represents a C$_1$-C$_{10}$ hydrocarbon-based radical that encompasses:

- C$_1$-C$_{10}$ alkyl radicals such as methyl, ethyl, propyl, butyl, pentyl, 2-ethylhexyl, octyl or decyl radicals;
- vinyl and allyl radicals; and
- C$_5$-C$_8$ cycloalkyl radicals such as phenyl, tolyl and xylyl radicals.

The crosslinking agents D are products that are available on the silicones market; furthermore, their use in room-temperature curing compositions is known; it occurs in particular in French patents FR-A-1 126 411, FR-A-1 179 969, FR-A-1 189 216, FR-A-1 198 749, FR-A-1 248 826, FR-A-1 314 649, FR-A-1 423 477, FR-A-1 432 799 and FR-A-2 067 636.

Preference is more particularly given, among the crosslinking agents D, to alkyltrialkoxysilanes, alkyl silicates and alkyl polysilicates, in which the organic radicals are alkyl radicals having from 1 to 4 carbon atoms.

As other examples of crosslinking agents D that may be used, mention is more particularly made of the following silanes:

propyltrimethoxysilane;
methyltrimethoxysilane;
ethyltrimethoxysilane;
vinyltriethoxysilane;
methyltriethoxysilane;
vinyltriethoxysilane;
propyltriethoxysilane;
tetraethoxysilane;
tetrapropoxysilane;
1,2-bis(trimethoxysilyl)ethane;
1,2-bis(triethoxysilyl)ethane; and
tetraisopropoxysilane, or else: CH$_3$Si(OCH$_3$)$_3$; C$_2$H$_5$Si(OC$_2$H$_5$)$_3$; C$_2$H$_5$Si(OCH$_3$)$_3$
CH$_2$=CHSi(OCH$_3$)$_3$; CH$_2$=CHSi(OCH$_2$CH$_2$OCH$_3$)$_3$
C$_6$H$_5$Si(OCH$_3$)$_3$; [CH$_3$][OCH(CH$_3$)CH$_2$OCH$_3$]Si[OCH$_3$]$_2$
Si(OCH$_3$)$_4$; Si(OC$_2$H$_5$)$_4$; Si(OCH$_2$CH$_2$CH$_3$)$_4$; Si(OCH$_2$CH$_2$CH$_2$CH$_3$)$_4$
Si(OC$_2$H$_4$OCH$_3$)$_4$; CH$_3$ Si(OC$_2$H$_4$OCH$_3$)$_3$; ClCH$_2$Si(OC$_2$H$_5$)$_3$.

As other examples of crosslinking agent D, mention may be made of ethyl polysilicate or n-propyl polysilicate.

Use is generally made of 0.1 to 60 parts by weight of crosslinking agent D per 100 parts by weight of polyorganosiloxane C capable of crosslinking via polycondensation to an elastomer.

Thus the composition according to the invention may comprise at least one adhesion promoter E such as, for example, the organosilicon compounds bearing both:
  (1) one or more hydrolyzable groups bonded to the silicon atom, and
  (2) one or more organic groups substituted with radicals comprising a nitrogen atom or chosen from the group of (meth)acrylate, epoxy and alkenyl radicals, and more preferably still from the group constituted by the following compounds, taken alone or as a mixture:
vinyltrimethoxysilane (VTMO);
3-glycidoxypropyltrimethoxysilane (GLYMO);
methacryloxypropyltrimethoxysilane (MEMO);
[H$_2$N(CH$_2$)$_3$]Si(OCH$_2$CH$_2$CH$_3$)$_3$;
[H$_2$N(CH$_2$)$_3$]Si(OCH$_3$)$_3$;
[H2N(CH$_2$)$_3$]Si(OC$_2$H$_5$)$_3$;
[H$_2$N(CH$_2$)$_4$]Si(OCH$_3$)$_3$;
[H$_2$NCH$_2$CH(CH$_3$)CH$_2$CH$_2$]SiCH$_3$(OCH$_3$)$_2$;
[H$_2$NCH$_2$]Si(OCH$_3$)$_3$;
[n-C$_4$H$_9$—HN—CH$_2$]Si(OCH$_3$)$_3$;
[H$_2$N(CH$_2$)$_2$NH(CH$_2$)$_3$]Si(OCH$_3$)$_3$;
[H$_2$N(CH$_2$)$_2$NH(CH$_2$)$_3$]Si(OCH$_2$CH$_2$OCH$_3$)$_3$;
[CH3NH(CH$_2$)$_2$NH(CH$_2$)$_3$]Si(OCH$_3$)$_3$;
[H(NHCH$_2$CH$_2$)$_2$NH(CH$_2$)$_3$]Si(OCH$_3$)$_3$;

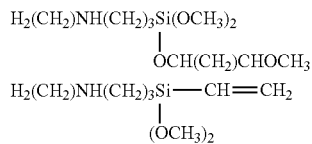

or polyorganosiloxane oligomers containing such organic groups at a content greater than 20%.

For the single-component and two-component bases, use is made, as the mineral fillers F, of very finely divided products, the average particle diameter of which is less than 0.1 μm. These fillers include fumed silicas and precipitated silicas; their BET specific surface area is generally greater than 40 m$^2$/g. These fillers may also be in the form of more coarsely divided products, having an average particle diameter greater than 0.1 μm. As examples of such fillers, mention may be made of ground quartz, diatomaceous silicas, calcium carbonate, calcined clay, rutile-type titanium oxide, iron, zinc, chromium, zirconium or magnesium oxides, the various forms of alumina (hydrated or unhydrated), boron nitride, lithopone, barium metaborate, barium sulfate and glass microbeads; their specific surface area is generally less than 30 m$^2$/g.

These fillers may have been surface-modified by treatment with the various organosilicon compounds customarily employed for this purpose. Thus, these organosilicon compounds may be organochlorosilanes, diorganocyclopolysiloxanes, hexaorganodisiloxanes, hexaorganodisilazanes or diorganocyclopolysilazanes (French patents FR-A-1 126 884, FR-A-1 136 885 and FR-A-1 236 505, and British patent GB-A-1 024 234). The treated fillers contain, in most cases, from 3 to 30% of their weight of organosilicon compounds. The fillers may be constituted of a mixture of several types of fillers of different particle size; thus, for example, they may be constituted of 30 to 70% of finely divided silicas with a BET specific surface area greater than 40 m$^2$/g and of 70 to 30% of more coarsely divided silicas with a specific surface area less than 30 m$^2$/g.

The purpose of introducing fillers is to give good mechanical and rheological properties to the elastomers that result from the curing of the compositions according to the invention.

In combination with these fillers, use may be made of mineral and/or organic pigments and also agents that improve the thermal resistance (salts and oxides of rare-earth elements such as ceric oxides and hydroxides) and/or the fire resistance of the elastomers. For example, it is possible to use the cocktails of oxides described in international application WO 98/29488. Mention may be made, among the agents for improving the fire resistance, of halogenated organic derivatives, organic phosphorus derivatives, platinum derivatives, such as chloroplatinic acid (its reaction products with alkanols or ethers), or platinous chloride-olefin complexes. These pigments and agents together represent at most 20% of the weight of the fillers.

Other customary auxiliary agents and additives may be incorporated into the composition according to the invention; these are chosen as a function of the applications in which said compositions are used.

The silicone base used to produce the composition according to the invention may comprise:
  100 parts of polyorganosiloxane oil C capable of crosslinking via polycondensation into an elastomer;
  0 to 20 parts of a crosslinking agent D;
  0 to 20 parts of an adhesion promoter E; and
  0 to 50 parts of filler F.

Besides the main constituents, nonreactive linear polyorganosiloxane polymers (G) may be introduced with the intention of acting on the physical characteristics of the compositions in accordance with the invention and/or on the mechanical properties of the elastomers resulting from the curing of these compositions.

These nonreactive linear polyorganosiloxane polymers (G) are well known; they comprise more especially: α,ω-bis(triorganosiloxy)diorganopolysiloxane polymers with viscosities of at least 10 mPa·s at 25° C. formed essentially of diorganosiloxy units and of at least 1% of monoorganosiloxy and/or siloxy units, the organic radicals bonded to the silicon atoms being chosen from the methyl, vinyl and phenyl radicals, 60% at least of these organic radicals being methyl radicals and 10% at most being vinyl radicals. The viscosity of these polymers can reach several tens of millions of mPa·s at 25° C.; they therefore include oils with a fluid to viscous appearance and soft to hard gums. They are prepared according to the usual techniques described more specifically in French patents FR-A-978 058, FR-A-1 025 150, FR-A-1 108 764 and FR-A-1 370 884. Use is preferably made of α,ω-bis(trimethylsiloxy)dimethylpolysiloxane oils with a viscosity ranging from 10 mPa·s to 1000 mPa·s at 25° C. These polymers, which act as plasticizers, can be introduced in a proportion of at most 70 parts, preferably of 5 to 20 parts, per 100 parts of the polyorganosiloxane oil C capable of crosslinking via polycondensation.

The compositions according to the invention may moreover advantageously comprise at least one silicone resin (H). These silicone resins are branched organopolysiloxane polymers which are well known and which are available commercially. They have, per molecule, at least two different units chosen from those of formula R'''$_3$SiO$_{1/2}$ (M unit), R'''$_2$SiO$_{2/2}$ (D unit), R'''SiO$_{3/2}$ (T unit) and SiO$_{4/2}$ (Q unit). The R''' radicals are identical or different and are chosen from linear or branched alkyl radicals or vinyl, phenyl or 3,3,3-trifluoropropyl radicals. Preferably, the alkyl radicals have from 1 to 6 carbon atoms inclusive. More particularly, mention may be made, as alkyl R radicals, of methyl, ethyl, isopropyl, tert-butyl and n-hexyl radicals. These resins are preferably hydroxylated and have, in this case, a weight content of hydroxyl groups of between 5 and 500 meq/100 g.

Mention may be made, as examples of resins, of MQ resins, MDQ resins, TD resins and MDT resins.

In order to manufacture the compositions according to the invention it is necessary, in the case of the single-component compositions, to use equipment that makes it possible to intimately mix the various fundamental constituents in a moisture-free environment, with or without a supply of heat, optionally added to which constituents are the aforementioned adjuvants and additives. All these ingredients may be loaded into the equipment in any order of introduction. Thus, it is possible to firstly mix the organopolysiloxane oils C and the fillers F and then to add to the paste obtained the crosslinkers D, the compounds E and the catalyst according to the invention. It is also possible to mix the oils C, the crosslinkers D, the compounds E and the fillers F and to subsequently add the catalyst according to the invention. During these operations, the mixtures may be heated at a temperature within the range of 50-180° C. under atmospheric pressure or under a reduced pressure in order to promote the removal of volatile materials.

The single-component compositions according to the invention, used as they are, that is to say undiluted, or in the form of dispersions in diluents, are stable during storage in the absence of water and cure at low temperatures (after removal of solvents in the case of dispersions) in the presence of water to form elastomers.

After the deposition of the compositions as they are, onto solid substrates, in a humid atmosphere, it is observed that a process of curing into elastomers occurs, it takes place from the outside to the inside of the mass deposited. A skin forms first at the surface, then the crosslinking continues in depth. The complete formation of the skin, which results in a tack-free feel of the surface, requires a period of time of a few minutes; this period of time depends on the degree of relative humidity of the atmosphere surrounding the compositions and on the crosslinkability of the latter.

Furthermore, the in-depth curing of the deposited layers, which must be sufficient to allow the demolding and handling of the elastomers formed, requires a longer period of time. Indeed, this period of time depends not only on the factors mentioned above for the formation of the tack-free feel but also on the thickness of the deposited layers, which thickness generally lies between 0.5 mm and several centimeters. The single-component compositions may be used for multiple applications such as jointing in the construction industry, assembling the most diverse materials (metals, plastics, natural and synthetic rubbers, wood, board, earthenware, brick, ceramic, glass, stone, concrete, masonry units), insulating electrical conductors, the potting of electronic circuits, or the preparation of molds used for manufacturing articles made of synthetic resins or foams.

The manufacture of the two-component compositions according to the invention is also carried out by mixing various constituents in suitable equipment. In order to obtain homogeneous compositions, it is preferable to firstly mix the polymers A with the fillers C; the whole mixture may be heated for at least 30 minutes at a temperature above 80° C., so as to complete the wetting of the fillers by the oils. To the mixture obtained, preferably brought to a temperature below 80° C., for example of around room temperature, may be added the other constituents, that is to say the crosslinking agents, the catalyst and optionally various additives and adjuvants and even water.

The compositions in accordance with the invention may be employed for multiple applications, such as jointing and/or bonding in the construction industry or the transportation industry (e.g.: automobile, aerospace, railroad, maritime and aeronautical industries), assembling the most diverse materials (metals, plastics, natural and synthetic rubbers, wood, boards, polycarbonate, earthenware, brick, ceramic, glass, stone, concrete and masonry units), insulating electrical conductors, the potting of electronic circuits, and the preparation of molds used for manufacturing articles made of synthetic resins or foams.

Thus, another subject of the invention consists of a two-component system that is a precursor of the organopolysiloxane composition according to the invention and as defined above that can be vulcanized to a silicone elastomer via polycondensation reactions, characterized in that it is in two separate parts P1 and P2 intended to be mixed in order to form said composition, and in that one of these parts comprises the metal complex or salt A according to the invention and as defined above as a catalyst for the polycondensation reaction of organopolysiloxanes and the crosslinking agent D, whilst the other part is free of the aforementioned species and comprises:

per 100 parts by weight of the polyorganosiloxane oil(s) C capable of crosslinking via polycondensation into an elastomer;

from 0.001 to 10 part(s) by weight of water.

Another subject of the invention also consists of a single-component polyorganosiloxane composition that is stable during storage in the absence of moisture and that crosslinks, in the presence of water, into an elastomer, characterized in that it comprises:

at least one crosslinkable linear polyorganopolysiloxane that has functionalized ends of alkoxy, oxime, acyl and/or enoxy type, preferably alkoxy type;

a filler; and a catalyst of the polycondensation reaction which is the metal complex A according to the invention and as defined above.

Single-component bases are described in detail, for example, in patents EP 141 685, EP 147 323, EP 102 268, EP 21 859, FR 2 121 289 and FR 2 121 631, cited as reference.

It is possible to add, to these single-component bases, adhesion promoters E chosen, for example, from organosilicon compounds simultaneously bearing, on the one hand, organic groups substituted by radicals chosen from the group of amino, ureido, isocyanate, epoxy, alkenyl, isocyanurate, hydantoyl, guanidino and mercaptoester radicals and, on the other hand, hydrolyzable groups, in general alkoxy groups bonded to the silicon atoms. Examples of such adhesion agents are described in United States patents U.S. Pat. No. 3,517,001, U.S. Pat. No. 4,115,356, U.S. Pat. No. 4,180,642, U.S. Pat. No. 4,273,698, U.S. Pat. No. 4,356,116 and in European patents EP 31 996 and EP 74 001.

Two-component bases are described in detail, for example, in patents EP 118 325, EP 117 772, EP 10 478, EP 50 358, EP 184 966, U.S. Pat. No. 3,801,572 and U.S. Pat. No. 3,888,815 cited as reference.

Another subject of the invention consists of the use of a metal complex or salt A according to the invention and as defined above as a catalyst for the polycondensation reaction of organopolysiloxanes.

The final subject of the invention consists of an elastomer obtained by crosslinking and curing of the two-component system according to the invention and as described above, or of the composition according to the invention and as described above.

Other advantages and features of the present invention will appear on reading the following examples that are given by way of illustration and that are in no way limiting.

EXAMPLES

Example 1

Synthesis of Catalysts (5) and (6) According to the Invention a) Synthesis of catalyst (5):

[Zn(isopropyl acetoacetato)$_2$] or [Zn(iPr-AA)$_2$] where iPr-AA=the isopropyl acetoacetato anion or the enolate anion of isopropyl acetoacetate.

A solution of 100 mmol of sodium methylate at a concentration of 97% (6.12 g) in 100 ml of isopropanol was concentrated by distillation of 20%, then 100 mmol of isopropyl acetoacetate at a concentration of 95% (15.93 g) were added and the solution was heated at 80° C. for 1 h in order to obtain a homogeneous orange solution. A solution of zinc chloride (50 mmol, 7 g) in 50 ml of isopropanol was then added at 70° C. over 1 h. The heating was maintained between 80 and 90° C. for 3 h 30 min, then the sodium chloride formed was filtered after cooling. The alcoholic solution was evaporated to dryness in order to result in 25.3 g of a paste which was redissolved in 200 ml of ethanol. After high-temperature filtration and evaporation to dryness, 17.2 g of a white solid (98% yield) were obtained.

Zn content calculated: 18.59%, Zn content assayed (ICP): 18.57%

IR analysis (nm): 2989, 1617, 1514, 1246, 1170.

b) Synthesis of the zinc bis(2,2,7-trimethyl-3,5-octanedionate) catalyst of formula (6):

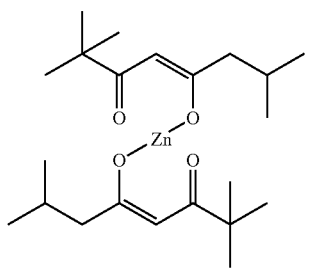

(6)

0.86 g of sodium hydroxide (21 mmol) were dissolved in 10 ml of absolute ethanol, then 4 g of 2,2,7-trimethyl-3,5-octanedione (21 mmol) were added to the solution obtained. A solution of 1.55 g of zinc chloride (11 mmol) in 10 ml of absolute ethanol was added over 5 min to the pale yellow solution of the sodium enolate. The mixture was stirred for 3 h at 20° C. then 10 ml of toluene were added. The suspension of sodium chloride was cooled to 10° C. with stirring then filtered. The filtrate was evaporated under vacuum to give 4 g of a thick clear oil (90% yield).

Proton NMR analysis in dimethylsulfoxide (DMSO) revealed that the structure of the complex thus formed was in the form of a single isomer: Chemical shifts: 0.87 (12H, doublet), 1.05 (18H, singlet), 1.95 (6H, unresolved peak), 5.33 (2H, singlet).

Zn content calculated: 15.1%, Zn content assayed: (ICP) 14.9%

Example 2

Initial Test

Catalyst (3): Zn(DPM)$_2$ or [Zn(t-Bu-acac)$_2$] where (t-Bu-acac)=the 2,2,6,6-tetramethyl-3,5-heptanedionato anion or the enolate anion of 2,2,6,6-tetramethyl-3,5-heptanedione;

Catalyst (4): [Zn(EAA)$_2$] where EAA=the ethyl acetoacetato anion or the enolate anion of ethyl acetoacetate;

Catalyst (5): [Zn(iPr-AA)$_2$] where iPr-AA=the isopropyl acetoacetato anion or the enolate anion of isopropyl acetoacetate; and zinc bis(2,2,7-trimethyl-3,5-octanedionate) catalyst of formula (6):

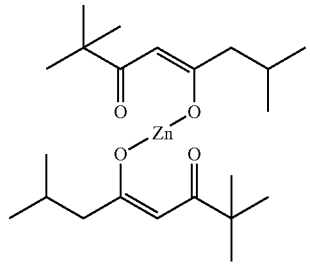

(6)

In order to demonstrate the catalytic activity of novel species, two simple tests were developed.

In the 2 tests, the procedure below was followed:

The functionalized or unfunctionalized oil, then the catalyst, then the crosslinker in the case of the RTV2 composition, then optionally the water were placed successively in a small open cylindrical container equipped with a magnetic stirrer bar, and the stirring was set at 300 rpm. The following were measured: the time when the stirring stops which corresponds to a viscosity of 1000 cP (or mPa) approximately, then the time for the oil to no longer flow, the tack-free skin-over time and the core crosslinking time. The activity of the novel catalysts was compared to that of tetrabutyldistannoxane dilaurate or Tegokat 225, one of the fastest dialkyltin type catalysts (1.24 mmol in Sn equivalents).

RTV1 Test:

The same oil used before was previously functionalized with vinyltrimethoxysilane (VTMO); the species to be tested was brought into contact with this oil under the same conditions as before, then 2 equivalents of water were added (2 eq./initial OH).

The amounts used in the examples below, unless mentioned, were the following:

4.77 g of VTMO-functionalized 48V100 oil;

1.24 mmol of species to be tested (1/2 eq./OH);

90 μl A of water (added after 1 min of stirring=t$_0$).

RTV2 Test:

The species to be tested was brought into contact with a short α,ω-dihydroxylated polydimethylsiloxane oil (½ equivalent relative to the OH content, viscosity of 100 mPa·s, 48V100 oil) then a crosslinker, ethyl silicate was added (1 equivalent/OH), or the same volume of "advanced" ethyl silicate, that is to say a mixture of ethoxypolysiloxanes (in this case>1 eq/OH).

The amounts used in the examples below, unless mentioned, were the following:
  4.48 g of 48V100 oil having 0.553 mmol OH/g (viscosity: 100 cP or mPa);
  1.24 mmol of species to be tested (1/2 eq./OH);
  0.52 g of ethyl silicate (1 eq./OH) or the same volume of "advanced" silicate as the ethyl silicate (=0.82 g).

The results of the RTV1 test are given in table I below:

TABLE I

| | | | RTV1 tests | | | | |
|---|---|---|---|---|---|---|---|
| | Metal | Catalyst | Time when stirring stops (h:min) | Time to end of flowability (h:min) | Tack-free time (h:min) | Crosslinking time (h:min) | Hard/liquid after 24 h |
| Comparative example 1 | Sn | Tegokat 225 | 00:19 | 00:22 | 00:25 | 00:34 | hard |
| Comparative example 2 | Zn | Zn (2-ethyl-hexanoate)$_2$ | 30 h | | | no crosslinking | liquid |
| Catalyst (3) Invention | Zn | Zn(DPM)$_2$ | 01:00 | 01:10 | 01:45 | 01:30 | very hard |

The results of the ethyl silicate crosslinker RTV2 test are given in table II below:

TABLE II

| | | | Ethyl silicate RTV2 tests | | | | |
|---|---|---|---|---|---|---|---|
| | Metal | Catalyst | Time when stirring stops (h:min) | Time to end of flowability (h:min) | Tack-free time (h:min) | Crosslinking time (h:min) | Hard/liquid after 24 h |
| Comparative example 1 | Sn | dibutyllaurate-distannoxane (Tegokat225) | 00:20 | 00:30 | 00:42 | 00:42 | hard |
| Comparative example 2 | Zn | Zn(acac)$_2$, H$_2$O | 03:15 | 04:00 | 04:20 | between 7 and 24 h | hard |
| Comparative example 3 | Zn | Zn(2-ethyl-hexanoate)$_2$ | 30 h | | | no cross-linking | viscous liquid |
| Catalyst (3) Invention | Zn | Zn(DPM)$_2$ | 02:20 | 02:20 | 02:20 | 03:20 | hard |
| Catalyst (4) Invention | Zn | [Zn (EAA)$_2$] | 03:40 | 04:35 | 04:35 | 04:35 | hard |
| Catalyst (5) Invention | Zn | [Zn (iPr-AA)$_2$] | 04:00 | 04:30 | 04:30 | skin on surface | hard |

Comparative tests 2 and 3 (zinc diacetylacetonate or [Zn (acac)$_2$, H$_2$O] and Zn(2-ethylhexanoate)$_2$) show that the catalysts according to the prior art do not permit crosslinking in times acceptable for this type of application.

The results of the "advanced" silicate crosslinker RTV2 test are given in table III below.

TABLE III

| | | | "Advanced" silicate RTV2 tests | | | | |
|---|---|---|---|---|---|---|---|
| | Metal | Catalyst | Time when stirring stops (h:min) | Time to end of flowability (h:min) | Tack-free time (h:min) | Crosslinking time (h:min) | Hard/liquid after 24 h |
| Comparative example 1 | Zn | Zn(2-ethyl-hexanoate)$_2$ | | | | no crosslinking | liquid |
| Catalyst (3) Invention | Zn | Zn(DPM)$_2$ | 00:45 | 00:45 | 00:45 | 01:00 | very hard |
| Catalyst (5) Invention | Zn | [Zn (iPr-AA)$_2$] | 01:50 | 02:00 | 02:00 | 03:00 | hard |

Example 3

Paste Test for RTV1 and RTV2 Compositions

Secondly, certain catalysts were also tested in closer systems known as "pastes".

In RTV1 compositions, the paste used was prepared as follows: added, with stirring, to a mixture of 3464 g of an α,ω-dihydroxylated oil with a viscosity of 20,000 centipoise containing 0.066% of OH, and of 120 g of vinyltrimethoxysilane were 16 g of a 2 wt % solution of lithium hydroxide in methanol, then, after 5 min, 400 g of AE55 fumed silica were added. The mixture was devolatilized under vacuum then stored in a moisture-free environment.

For each test, the catalyst tested was mixed with 50 g of this paste, then the catalytic potential was evaluated in 3 ways (see the tables of results below):

the skin-over time (SOT), time at the end of which surface crosslinking is observed, on a 2 mm film;
the persistence of a tacky feel at 48 h;
the hardness (Shore A hardness) of a 6 mm thick bead under controlled conditions (23° C. and 50% relative humidity) and over increasing times (2, 3, 4, 7 and 14 days). The high temperature stability was also evaluated by hardness measurements carried out on the bead after 7 days at room temperature followed by 7 days at 100° C.

NB: The Shore hardness was measured on a 6 mm bead. In the tables of results the symbol ">" corresponds to the hardness values measured on the upper part of the bead and the symbol "<" corresponds to the hardness values measured on the lower part of the bead that is less exposed to the ambient air than the upper part.

Various catalysts according to the invention were tested. By way of comparison, as above, the following were also tested:

a tin-based catalyst: dibutyltin dilaurate (DBTDL);

The results are given in table IV below:

TABLE IV

RTV1 paste tests

| | | | | | Shore A hardness over 6 mm | | | | | |
|---|---|---|---|---|---|---|---|---|---|---|
| Catalyst | Solvent in % | % by weight | SOT stick minutes | Tacky feel at 48 h | 2 d >< | 3 d >< | 4 d >< | 7 d >< | 14 d >< | 7 d RT + 7 d 100° C. >< |
| DBTDL Comparative example | / | 1 | 10 | no | 32 22 | | | 32 29 | | |
| Catalyst (3) Invention Zn(DPM)$_2$ | 50% ethyl acetate | 2.5 | 90 | yes | 9 14 | 15 19 | 17 20 | 21 22 | 24 22 | 24 22 |

In RTV2 compositions, the tests were carried out directly on a mixture of viscous α,ω-dihydroxylated polydimethylsiloxane oil (having a viscosity of 14,000 mPa·s) and of advanced silicate crosslinker (1 g per 22.5 g of oil) to which the catalyst was added and mixed therewith. Firstly, the pot-life was measured (time at the end of which the viscosity of the mixture prevents it from being used), then, starting from another mixture, a slug with a thickness of 6 mm was cast for the measurements of hardness over time (carried out as before on the top and on the bottom).

By way of comparison, as above, the following were also tested:

a tin-based catalyst: dimethyltin dineodecanoate (UL28).

The results are given in table V below.

TABLE V

RTV2 paste tests

| | | | | | Shore A hardness over 6 mm | | |
|---|---|---|---|---|---|---|---|
| Catalyst | Solvent | Molar equivalent | % by weight | Pot-life (min) | 1 d >< | 4 d >< | 21 d >< |
| UL28 Comparative example | no | 1 | 1.4 | 15 | 24 19 | 25 25 | 23 23 |
| Catalyst (3) Invention Zn(DPM)$_2$ | AcOEt no solvent but in milled form | 3 3 | 3.6 3.7 | 30 9 | 19 11 21 10 | 22 23 23 23 | 23 25 24 23 |

In the above table the symbol ">" corresponds to the hardness values measured on the upper part of the slug and the symbol "<" corresponds to the hardness values measured on the lower part of the slug that is less exposed to the ambient air than the upper part.

Example 4

RTV2 Paste Tests: Catalyst (6)

The tests were carried out by mixing 25 g of α,ω-dihydroxylated oil having a viscosity of 14,000 m·Pa·s, 1.06 g of prepolymerized ethyl silicate crosslinker and x mmol of catalyst (6) according to the invention which has the advantage of being in a liquid form that is viscous and soluble in silicones. The results were compared with those obtained with the dimethyltin dineodecanoate catalyst.

The pot-life, that is to say the time needed to form a gel which is no longer readily flowable, and Shore A hardnesses (top and bottom) of a 6 mm thick demolded slug were measured.

TABLE VI

| Catalyst tested | mmol/ 25 g of oil | Pot-life (min) | SAH 1 day > < | SAH 4 days > < | SAH 7 days > < |
|---|---|---|---|---|---|
| Catalyst (6) [Invention] | 2 | 12 | 19  9 | 23 23 | 23 26 |
| Catalyst (6) [Invention] | 1 | 18 | 16 11 | 20 21 | 19 23 |
| dimethyltin bisneodecanoate [Comparative example] | 0.7 | 6 | 22.5 22.5 | / | / |

In the above table the symbol ">" corresponds to the hardness values measured on the upper part of the slug and the symbol "<" corresponds to the hardness values measured on the lower part of the slug that is less exposed to the ambient air than the upper part.

Observation:

The pot-life with the novel catalyst (6) according to the invention is slightly longer than in the case of the tin catalyst allowing good flexibility of use for an RTV2 type application.

The invention claimed is:

1. An organopolysiloxane composition, comprising a silicone base B capable of curing via polycondensation reaction into a silicone elastomer comprising a polydimethylsiloxane, with hydroxyl end groups, optionally prefunctionalized by a silane so as to have functionalized ends selected from the group consisting of alkoxy, oxime, and enoxy type; and a catalytically effective amount of at least one polycondensation catalyst which is a metal complex or salt A of formula (1):

$$[Zn(L^1)(L^2)] \quad (1)$$

in which:
the symbols $L^1$ and $L^2$ are identical or different and represent a ligand which is a β-dicarbonylato anion; and
with the supplementary condition that the metal complex or salt A of formula (1) is not the zinc diacetylacetonate or $Zn(acac)_2$ compound,
wherein the polycondensation catalyst is selected from the group consisting of the complexes (3) to (6) below:

(3): $Zn(DPM)_2$ or $[Zn(t\text{-Bu-acac})_2]$ where DPM=(t-Bu-acac)= the 2,2,6,6-tetramethyl-3,5-heptanedionato anion;

(4): $[Zn(EAA)_2]$ where EAA=the ethyl acetoacetato anion;

(5): $[Zn(iPr\text{-AA})_2]$ where iPr-AA=the isopropyl acetoacetato anion; and (6):

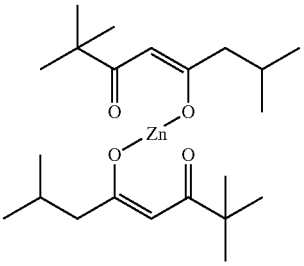

2. The composition as claimed in claim 1, wherein the silicone base B capable of curing via polycondensation reaction into a silicone elastomer comprising a polydimethylsiloxane, with hydroxyl end groups, optionally prefunctionalized by a silane so as to have functionalized ends selected from the group consisting of alkoxy, oxime, and enoxy type comprises:
optionally at least one crosslinking agent D;
optionally at least one adhesion promoter E; and
optionally at least one siliceous, organic and/or non-siliceous mineral filler F.

3. An elastomer obtained by crosslinking and curing the composition as claimed in claim 1.

4. The organopolysiloxane composition as claimed in claim 1, wherein the polycondensation catalyst is between 0.1% and 10% by weight of the organopolysiloxane composition.

5. The organopolysiloxane composition as claimed in claim 1, wherein the organopolysiloxane composition does not contain alkyltin-based catalysts.

6. The organopolysiloxane composition as claimed in claim 2, wherein the silicone base B comprises:
100 parts of the polydimethylsiloxane;
0 to 20 parts of the at least one crosslinking agent D;
0 to 20 parts of the at least one adhesion promoter E; and
0 to 50 parts of the at least one siliceous, organic and/or non-siliceous mineral filler F.

7. The organopolysiloxane composition as claimed in claim 6, wherein the crosslinking agent D is present and comprises:
a silane of the following general formula:

$$R^1_k Si(OR^2)_{(4-k)}$$

in which the symbols $R^2$, which are identical or different, represent alkyl radicals having from 1 to 8 carbon atoms, the symbol $R^1$ represents a linear or branched, saturated or unsaturated, aliphatic hydrocarbon-based group, a saturated or unsaturated and/or aromatic, monocyclic or polycyclic carbocyclic group, and k is equal to 0, 1 or 2; and
the partial hydrolysis products of the silane.

8. The organopolysiloxane composition as claimed in claim 1, wherein the polydimethylsiloxane has functionalized ends of alkoxy.

9. The organopolysiloxane composition as claimed in claim 1, wherein the polydimethylsiloxane, with hydroxyl end groups, is prefunctionalized by a silane so as to have functionalized ends selected from the group consisting of alkoxy, oxime, and enoxy type.

10. The organopolysiloxane composition as claimed in claim 2, wherein the polydimethylsiloxane, with hydroxyl end groups, is prefunctionalized by a silane so as to have functionalized ends selected from the group consisting of alkoxy, oxime, and enoxy type comprises:
at least one crosslinking agent D;
at least one adhesion promoter E; and
at least one siliceous, organic and/or non-siliceous mineral filler F.

11. A two-component system that is a precursor of an organopolysiloxane composition comprising:
100 parts by weight of a polyorganosiloxane oil(s) C, with hydroxyl end groups, optionally prefunctionalized by a silane so as to have functionalized ends selected from the group consisting of alkoxy, oxime, and enoxy type, the polyorganosiloxane oil(s) C capable of crosslinking via polycondensation into an elastomer;
from 0.001 to 10 part(s) by weight of water;
optionally at least one crosslinking agent D;
optionally at least one adhesion promoter E; and
optionally at least one siliceous, organic and/or non-siliceous mineral filler F;
wherein said system is in two separate parts P1 and P2 intended to be mixed in order to form said composition, and wherein one of said parts comprises a metal complex or salt A as a catalyst for the polycondensation reaction of an organopolysiloxane and the crosslinking agent D, whilst the other part is free of said catalyst and said crosslinking agent,
wherein the metal complex or salt A is formula (1):

$$[Zn(L^1)(L^2)] \tag{1}$$

in which:
the symbols $L^1$ and $L^2$ are identical or different and represent a ligand which is a β-dicarbonylato anion, an acetylacetato anion; and
with the supplementary condition that the metal complex or salt A of formula (1) is not the zinc diacetylacetonate or $Zn(acac)_2$ compound.

12. The two-component system as claimed in claim 11, wherein the polyorganosiloxane oil(s) C, with hydroxyl end groups, is functionalized at the ends with alkoxy; groups.

13. A single-component polyorganosiloxane composition that is stable during storage in the absence of moisture and that crosslinks, in the presence of water, into an elastomer comprising a polydimethylsiloxane, with hydroxyl end groups, optionally prefunctionalized by a silane so as to have functionalized ends selected from the group consisting of alkoxy, oxime, and enoxy type, said composition comprising:
at least one filler; and
a catalyst of the polycondensation reaction which is a metal complex or salt A of formula (1):

$$[Zn(L^1)(L^2)] \tag{1}$$

in which:
the symbols $L^1$ and $L^2$ are identical or different and represent a ligand which is a β-dicarbonylato anion; and
with the supplementary condition that the metal complex or salt A of formula (1) is not the zinc diacetylacetonate or $Zn(acac)_2$ compound,
wherein the polycondensation catalyst is selected from the group consisting of the complexes (3) to (6) below:
(3): $Zn(DPM)_2$ or $[Zn(t\text{-Bu-acac})_2]$ where DPM=(t-Bu-acac)= the 2,2,6,6-tetramethyl-3,5-heptanedionato anion;
(4): $[Zn(EAA)_2]$ where EAA=the ethyl acetoacetato anion;
(5): $[Zn(iPr-AA)_2]$ where iPr-AA=the isopropyl acetoacetato anion; and (6):

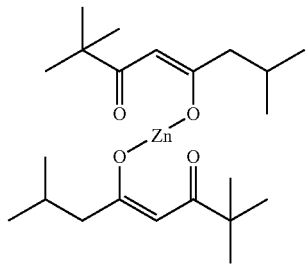

14. The single-component polyorganosiloxane composition as claimed in claim 13, wherein the polydimethylsiloxane, with hydroxyl end groups, is prefunctionalized by a silane so as to have functionalized ends selected from the group consisting of alkoxy, oxime, and enoxy type.

15. A method of making a silicone elastomer comprising curing via a polycondensation reaction without alkyl tin based catalysts an organopolysiloxone composition, comprising a silicone base B capable of curing via the polycondensation reaction comprising a polydimethylsiloxane with hydroxyl end groups, optionally prefunctionalized by a silane so as to have functionalized ends selected from the group consisting of alkoxy, oxime, and enoxy type;
with a catalytically effective amount of at least one polycondensation catalyst, wherein the polycondensation catalyst is selected from the group consisting of a metal complex or salt A of formula (1):

$$[Zn(L^1)(L^2)] \tag{1}$$

in which:
the symbols $L^1$ and $L^2$ are identical or different and represent a ligand which is a β-dicarbonylato anion; and
with the supplementary condition that the metal complex or salt A of formula (1) is not the zinc diacetylacetonate or $Zn(acac)_2$ compound.

16. The method as claimed in claim 15, wherein the polycondensation catalyst is selected from the group consisting of the complexes (3) to (6) below:
(3): $Zn(DPM)_2$ or $[Zn(t\text{-Bu-acac})_2]$ where DPM=(t-Bu-acac)=the 2,2,6,6-tetramethyl-3,5-heptanedionato anion;
(4): $[Zn(EAA)_2]$ where EAA=the ethyl acetoacetato anion;
(5): $[Zn(iPr-AA)_2]$ where iPr-AA=the isopropyl acetoacetato anion; and (6):

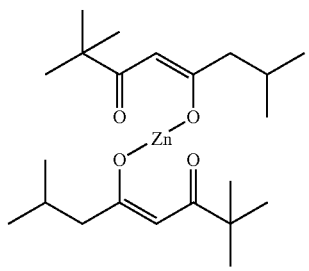

17. The method as claimed in claim 15, wherein $L^1$ and $L^2$ are β-diketonato anions derived from a β-diketone selected from the group consisting of the following β-diketones: 2,4- hexanedione; 2,4-heptanedione; 3,5-heptanedione; 3-ethyl-2,4-pentanedione; 5-methyl-2,4-hexanedione; 2,4-octanedione; 3,5-octanedione; 5,5-dimethyl-2,4-hexanedione; 6-methyl-2,4-heptanedione; 2,2-dimethyl-3,5-nonanedione; 2,6-dimethyl-3,5-heptanedione; 2-acetylcyclohexanone; 2,2,6,6-tetramethyl-3,5-heptanedione; 1,1,1,5,5,5-hexafluoro-2,4-pentanedione; benzoylacetone; dibenzoylmethane; 3-methyl-2,4-pentadione; 3-acetyl-2-pentanone; 3-acetyl-2-hexanone; 3-acetyl-2-heptanone; 3-acetyl-5-methyl-2-hexanone; stearoyl benzoyl methane; octanoyl benzoyl methane; 4-t-butyl-4'-methoxydibenzoylmethane; 4,4'-dimethoxydibenzoylmethane and 4,4'-di-tert-butyldibenzoylmethane.

18. The method as claimed in claim 15, wherein $L^1$ and $L^2$ are β-ketoesterato anions selected from the group consisting of the anions derived from the following compounds: methyl, ethyl, n-propyl, isopropyl, n-butyl, sec-butyl, isobutyl, tert-butyl, isopentyl, n-hexyl, n-octyl, 1-methylheptyl, n-nonyl, n-decyl and n-dodecyl esters of acetylacetic acid.

19. The method as claimed in claim 15, wherein the symbols $L^1$ and $L^2$ are identical or different and represent a ligand which is the enolate anion of a β-dicarbonyl-containing compound of formula (2) below:

$$R^1COCHR^2COR^3 \quad (2)$$

in which:
- $R^1$ represents a substituted or unsubstituted, linear or branched $C_1$-$C_{30}$ hydrocarbon-based radical;
- $R^2$ is a hydrogen or a substituted or unsubstituted, linear or branched $C_1$-$C_{30}$ hydrocarbon-based radical;
- $R^3$ represents a substituted or unsubstituted, linear, cyclic or branched $C_1$-$C_{30}$ hydrocarbon-based radical, a substituted or unsubstituted aromatic, or an —$OR^4$ radical with $R^4$ representing a substituted or unsubstituted, linear, cyclic or branched $C_1$-$C_{30}$ hydrocarbon-based radical, where
- $R^1$ and $R^2$ may be joined together to form a ring;
- $R^2$ and $R^3$ may be joined together to form a ring; and
  with the supplementary condition that the metal complex or salt A of formula (1) is not the zinc diacetylacetonate or $Zn(acac)_2$ compound.

20. A catalyst for the polycondensation reaction of an organopolysiloxane comprising a metal complex or salt A of formula (1):

$$[Zn(L^1)(L^2)] \quad (1)$$

in which:
- the symbols $L^1$ and $L^2$ are identical or different and represent a ligand which is a β-dicarbonylato anion; and
- with the supplementary condition that the metal complex or salt A of formula (1) is not the zinc diacetylacetonate or $Zn(acac)_2$ compound, wherein the polycondensation catalyst is selected from the group consisting of the complexes (3) to (6) below:

(3): $Zn(DPM)_2$ or $[Zn(t-Bu-acac)_2]$ where DPM=(t-Bu-acac)=the 2,2,6,6-tetramethyl-3,5-heptanedionato anion;

(4): $[Zn(iPr-AA)_2]$ where iPr-AA=the isopropyl acetoacetato anion; and (5):

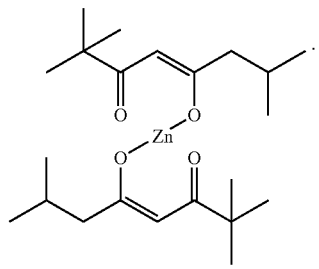

21. A compound of the following formulae:

(5): $[Zn(iPr-AA)_2]$ where iPr-AA=the isopropyl acetoacetato anion; or (6):

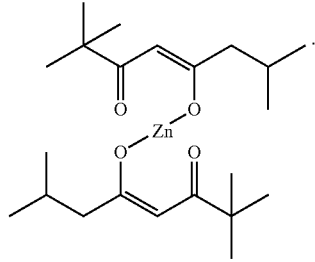

* * * * *